US009782811B2

(12) United States Patent
Sung et al.

(10) Patent No.: US 9,782,811 B2
(45) Date of Patent: Oct. 10, 2017

(54) APPARATUS AND METHOD FOR MANUFACTURING A SEAMLESS PIPE

(71) Applicant: KOREA AUTOMOTIVE TECHNOLOGY INSTITUTE, Cheonan-si, Chungcheongnam-do (KR)

(72) Inventors: Si Young Sung, Cheonan-si (KR); Beom Suck Han, Suwon-si (KR); Jin Pyeong Kim, Cheonan-si (KR)

(73) Assignee: KOREA AUTOMOTIVE TECHNOLOGY INSTITUTE, Cheonan-si, Chungcheongnam-do (KR)

( * ) Notice: Subject to any disclaimer, the term of this patent is extended or adjusted under 35 U.S.C. 154(b) by 566 days.

(21) Appl. No.: 14/368,034

(22) PCT Filed: Dec. 21, 2012

(86) PCT No.: PCT/KR2012/011230
§ 371 (c)(1),
(2) Date: Jun. 23, 2014

(87) PCT Pub. No.: WO2013/095031
PCT Pub. Date: Jun. 27, 2013

(65) Prior Publication Data
US 2015/0059426 A1    Mar. 5, 2015

(30) Foreign Application Priority Data

Dec. 23, 2011   (KR) .................. 10-2011-0141066
Aug. 3, 2012   (KR) .................. 10-2012-0085024

(51) Int. Cl.
*B21C 23/08*   (2006.01)
*B21C 37/06*   (2006.01)
(Continued)

(52) U.S. Cl.
CPC ............ *B21C 37/06* (2013.01); *B21C 23/085* (2013.01); *B21C 25/00* (2013.01); *B21C 25/02* (2013.01);
(Continued)

(58) Field of Classification Search
CPC ......... B21C 25/00; B21C 23/002; B21C 1/24; B21C 37/06; B21C 23/02; B21C 25/02;
(Continued)

(56) References Cited

U.S. PATENT DOCUMENTS

2005/0229667 A1* 10/2005 Jesson ...................... B21C 1/24
72/283
2012/0006086 A1* 1/2012 Manchiraju ........... B21C 23/002
72/253.1
(Continued)

FOREIGN PATENT DOCUMENTS

JP   10-052711 A   2/1998
JP   2000-015457 A   1/2000
(Continued)

OTHER PUBLICATIONS

Extended European Search Report dated Dec. 1, 2015; Appln. No. 12859884.4-1702/2796219 PCT/KR2012011230.
(Continued)

*Primary Examiner* — David B Jones
(74) *Attorney, Agent, or Firm* — Ladas & Parry LLP

(57) ABSTRACT

Provided is an apparatus of manufacturing a seamless pipe. The apparatus includes a container receiving a work therein, a stem pressing one end of the work within the container, a die installed in a direction opposite to the stem, and having an extrusion hole comprised of a plurality of ports, a rotation member installed on a front end of the die, having a stirring tip inserted into a joint surface formed by abutting a plurality of metal pieces to each other on one surface, and rotating to
(Continued)

perform a friction stir bonding in a state in which the one surface contacts the joint surface, and a correction mold including a metal pipe discharging path receiving a metal pipe manufactured by the friction stir bonding and discharging the metal pipe to an outside.

17 Claims, 12 Drawing Sheets

(51) Int. Cl.
<table>
<tr><td>B21C 25/00</td><td>(2006.01)</td></tr>
<tr><td>B21C 25/02</td><td>(2006.01)</td></tr>
<tr><td>B21C 35/02</td><td>(2006.01)</td></tr>
<tr><td>B23K 20/12</td><td>(2006.01)</td></tr>
<tr><td>B21C 25/04</td><td>(2006.01)</td></tr>
<tr><td>B23K 101/06</td><td>(2006.01)</td></tr>
<tr><td>B23K 103/04</td><td>(2006.01)</td></tr>
<tr><td>B23K 103/10</td><td>(2006.01)</td></tr>
<tr><td>B23K 103/12</td><td>(2006.01)</td></tr>
<tr><td>B23K 103/08</td><td>(2006.01)</td></tr>
</table>

(52) U.S. Cl.
CPC ............ B21C 25/04 (2013.01); B21C 35/023 (2013.01); B23K 20/122 (2013.01); B23K 20/125 (2013.01); B23K 20/126 (2013.01); B23K 2201/06 (2013.01); B23K 2203/04 (2013.01); B23K 2203/10 (2013.01); B23K 2203/12 (2013.01); B23K 2203/15 (2015.10)

(58) Field of Classification Search
CPC ... B21C 25/04; B21C 35/0023; B21C 35/023; B21C 23/085; B23K 20/122; B23K 20/125; B23K 20/126
USPC ............................................................ 72/68
See application file for complete search history.

(56) References Cited

U.S. PATENT DOCUMENTS

2014/0283574 A1* 9/2014 Lavender .............. B21C 23/002
    72/262
2015/0059426 A1* 3/2015 Sung ....................... B21C 25/00
    72/68

FOREIGN PATENT DOCUMENTS

| JP | 2004-322160 A | 11/2004 |
| JP | 2005-271026 A | 10/2005 |
| KR | 20080057444 A | 6/2008 |

OTHER PUBLICATIONS

International Search Report mailed Mar. 19, 2013; PCT/KR2012/011230.

* cited by examiner

[FIG. 1]
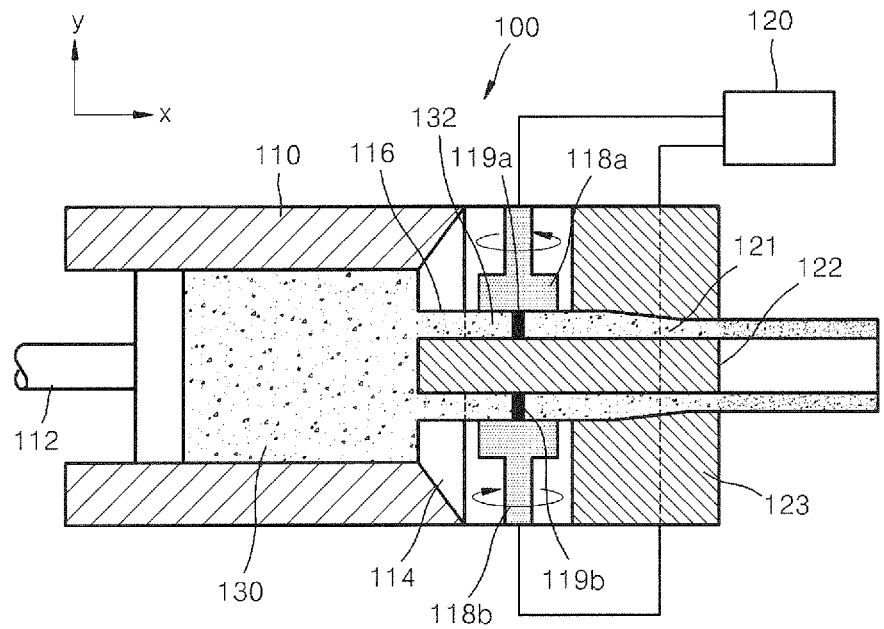
[FIG. 2]
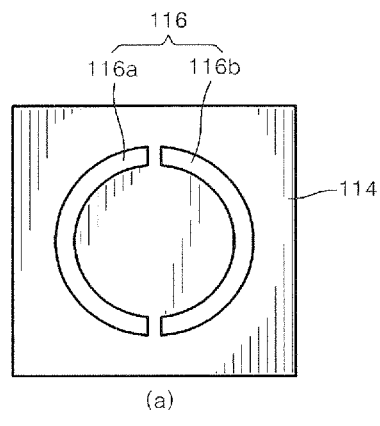
(a)
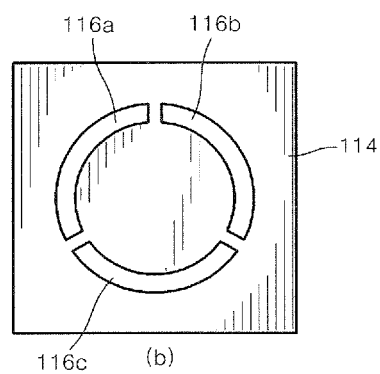
(b)

[FIG. 3]
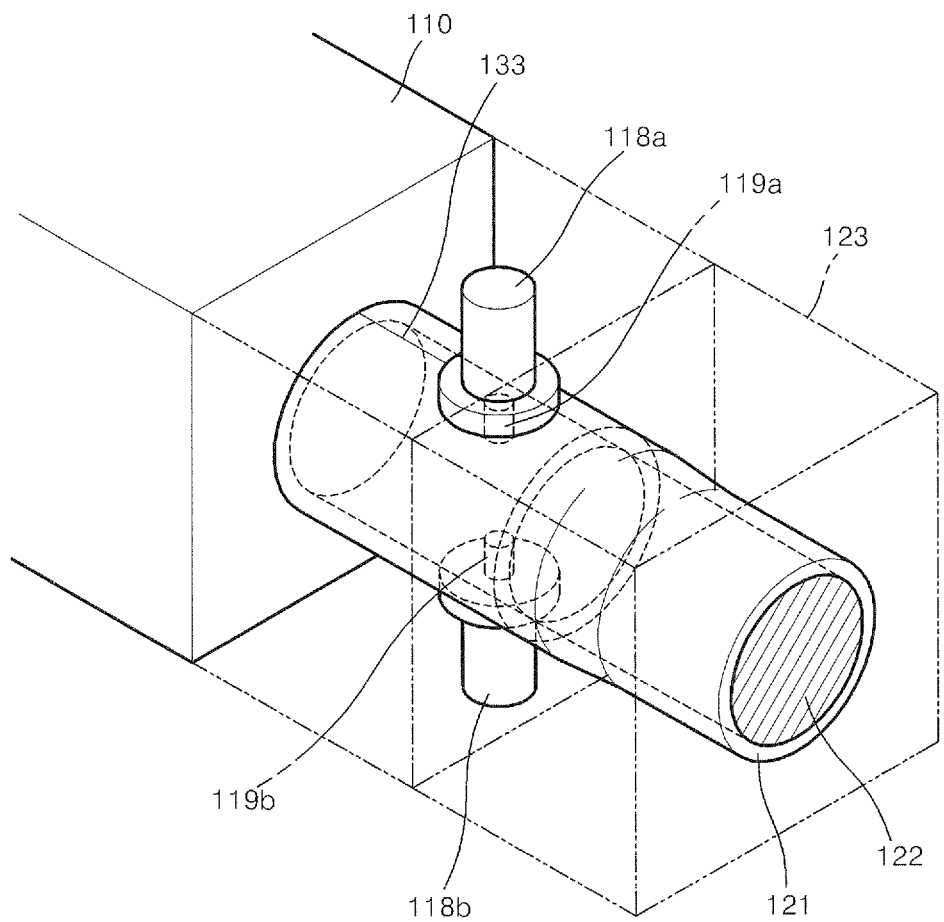
[FIG. 4]
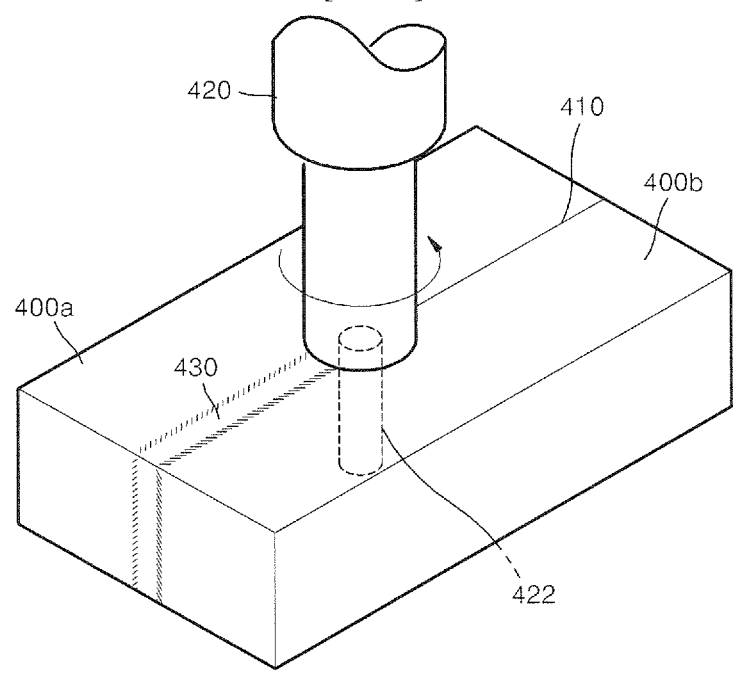

[FIG. 7]
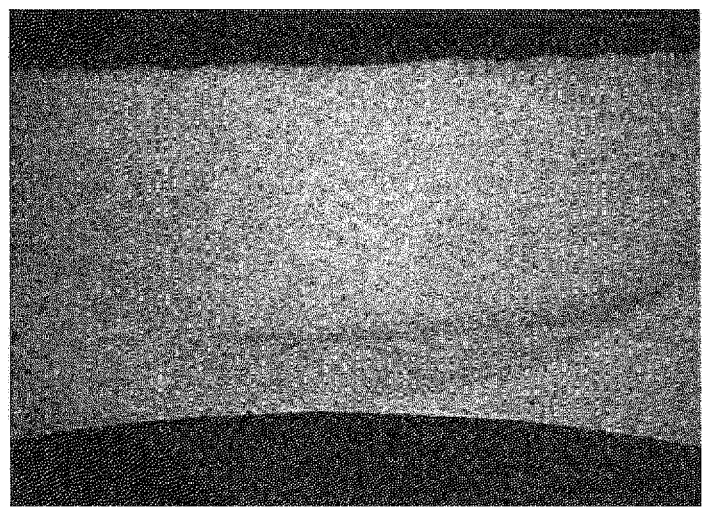
(a)
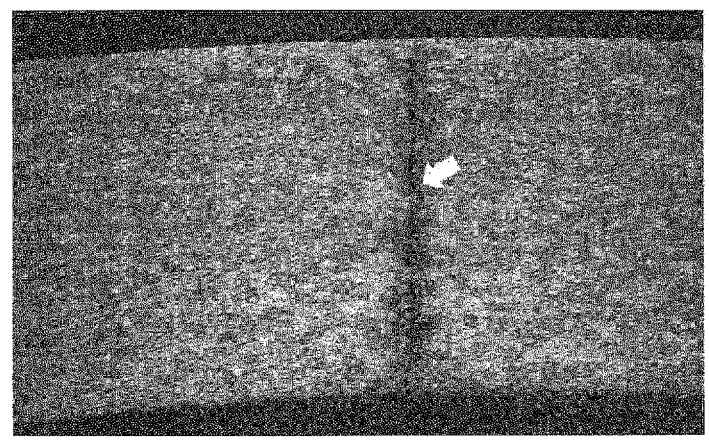
(b)

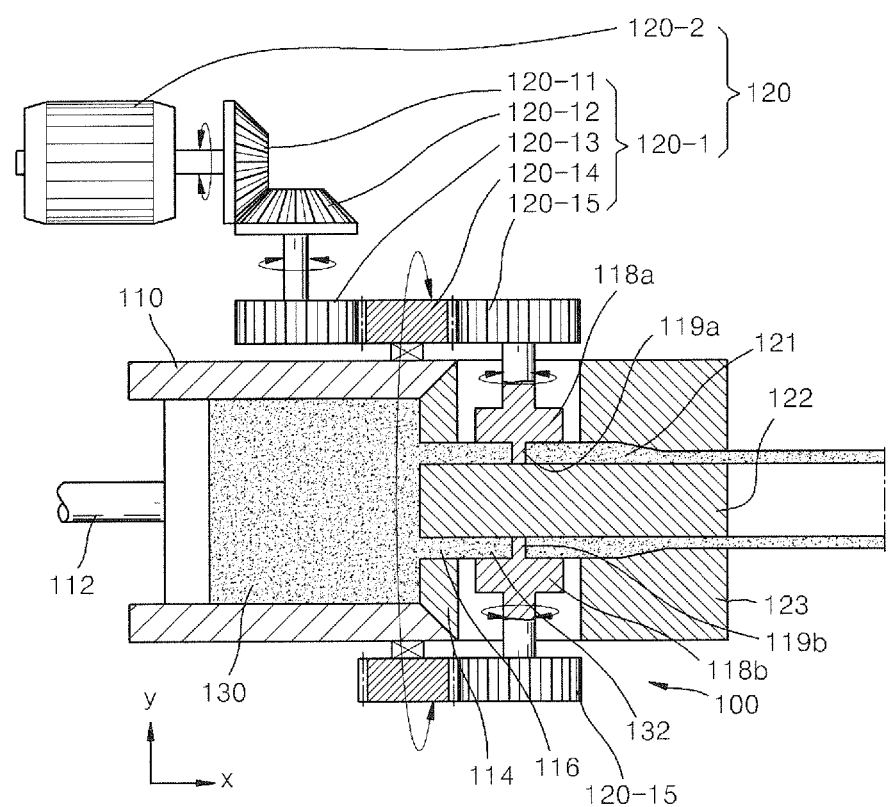
[FIG. 8]

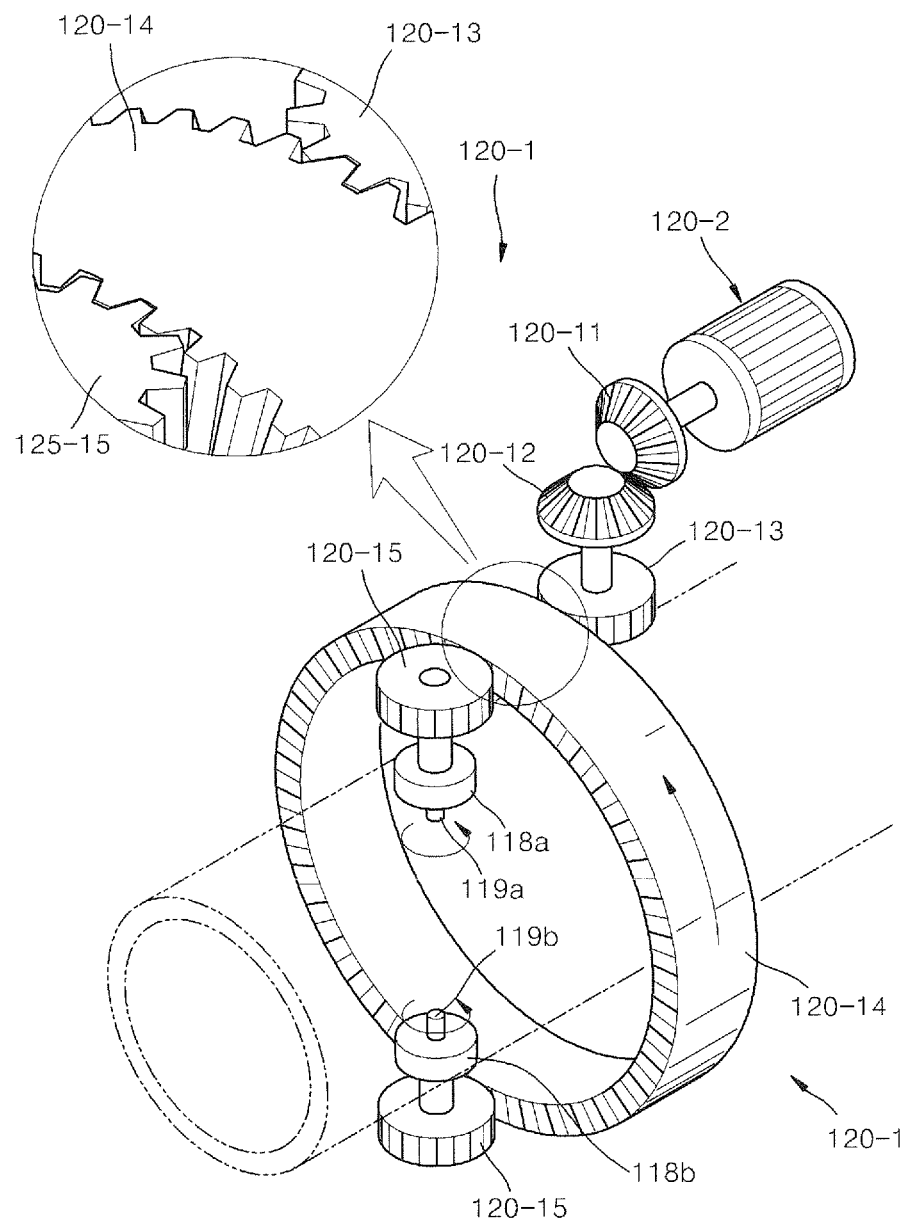
[FIG. 9]

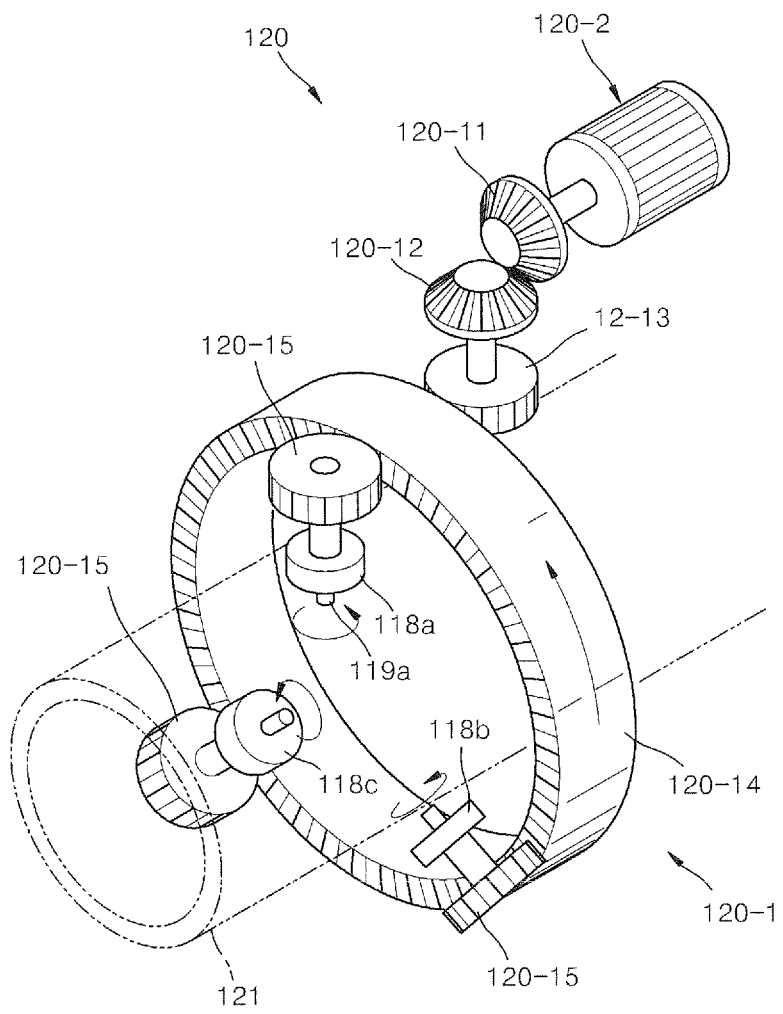
[FIG. 10]

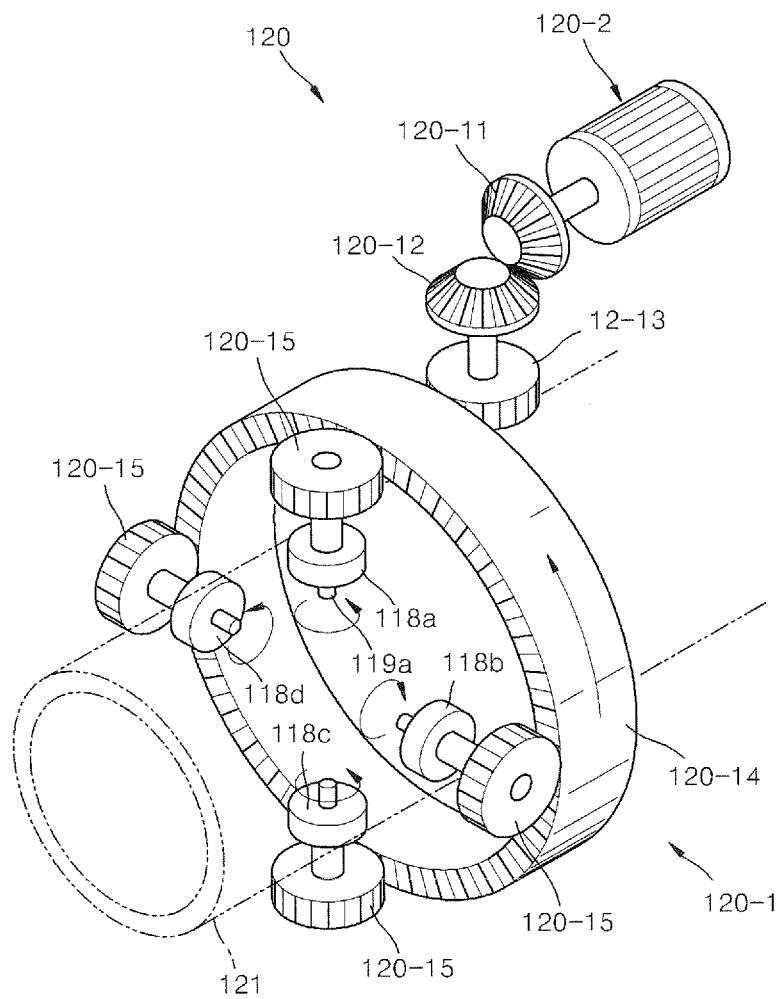

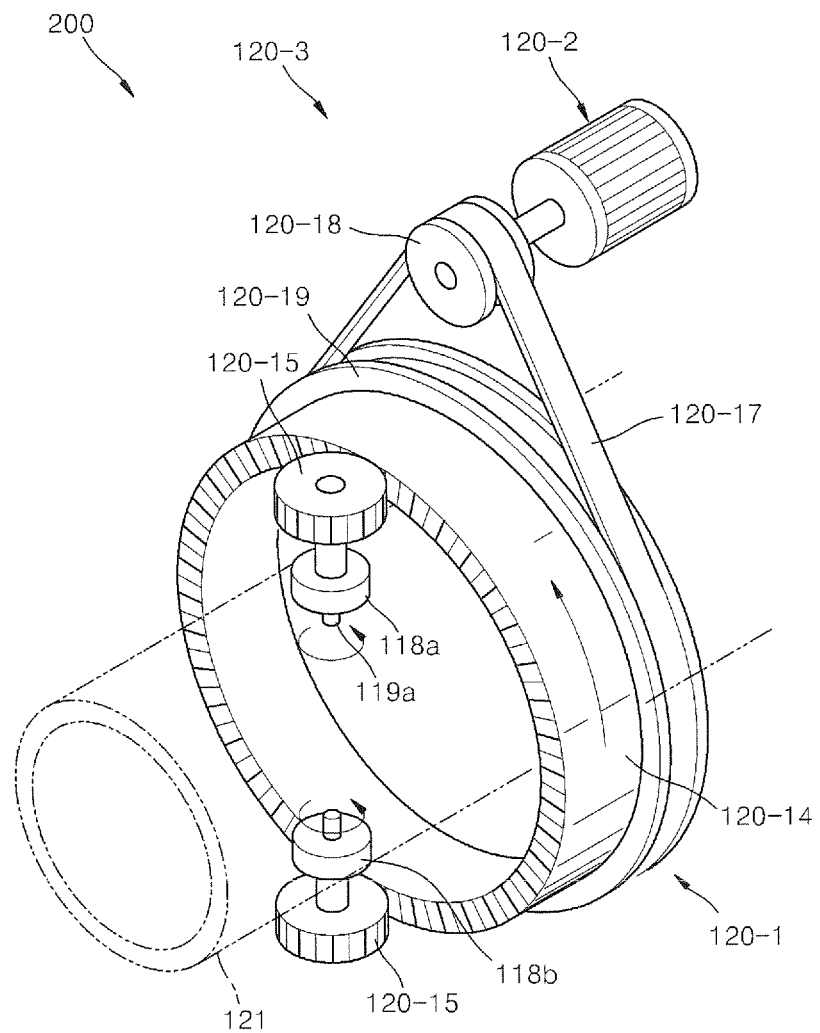

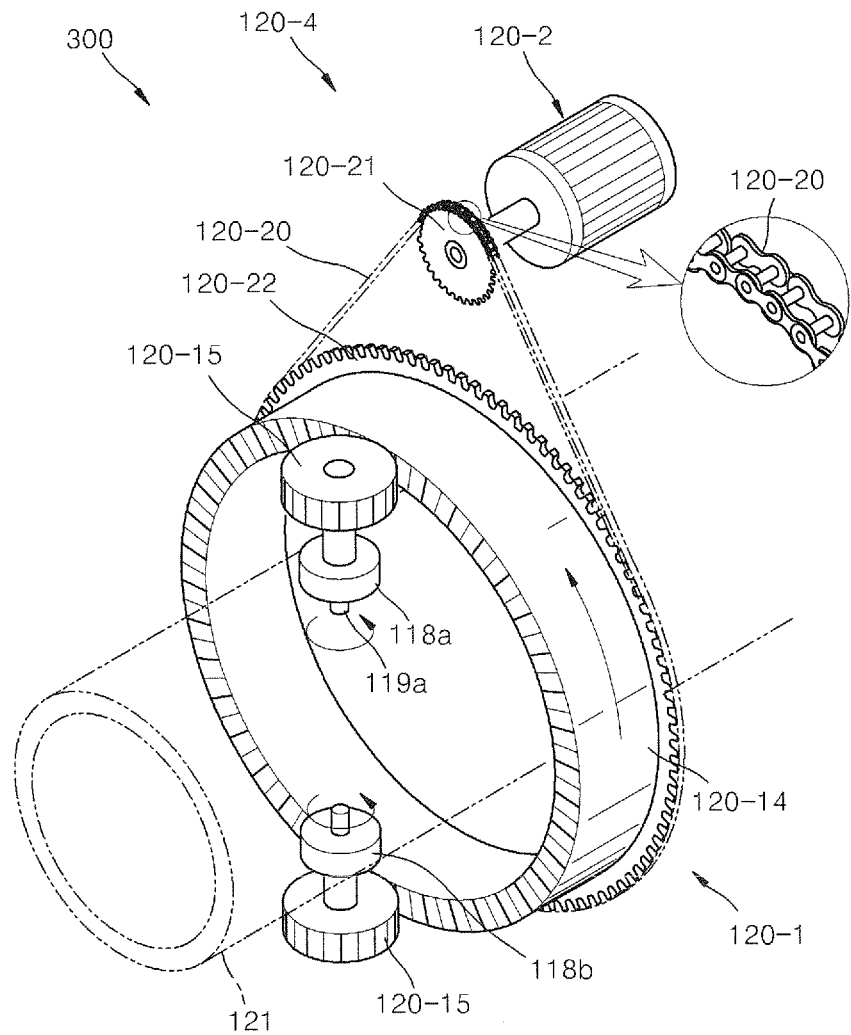
[FIG. 13]

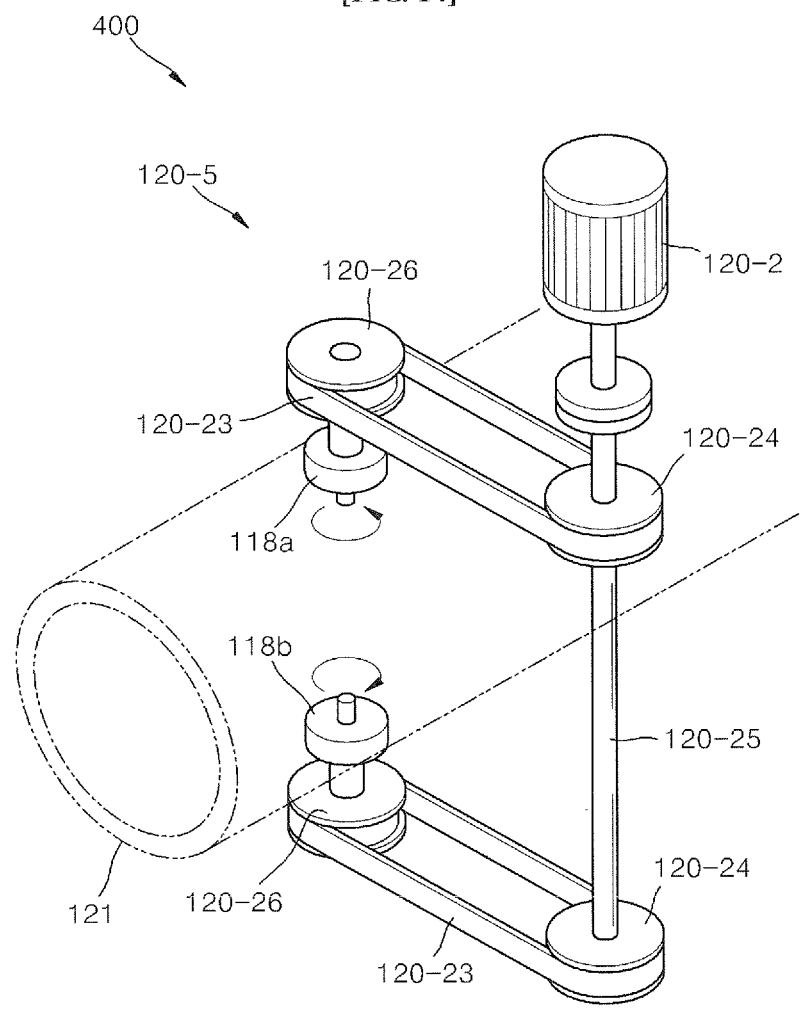
[FIG. 14]

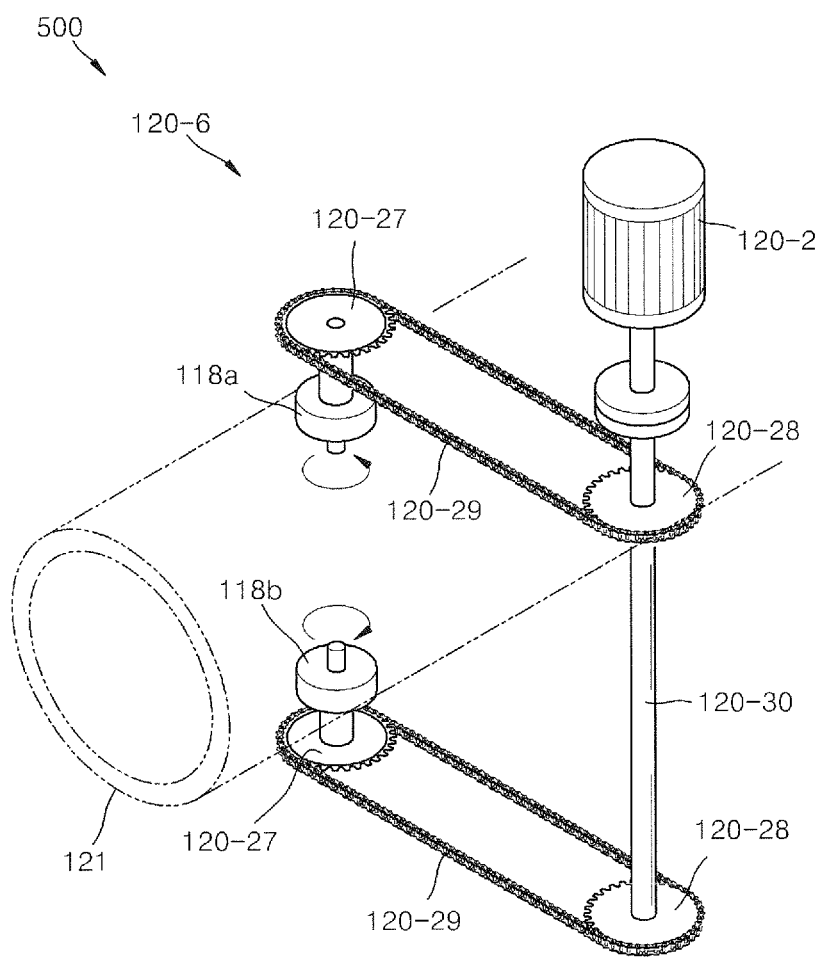

APPARATUS AND METHOD FOR MANUFACTURING A SEAMLESS PIPE

TECHNICAL FIELD

The present invention relates to a technology of manufacturing a metal pipe using a direct extrusion process, and more particularly, to an apparatus capable of manufacturing a seamless pipe by performing a friction stir bonding of a plurality of metal pieces while manufacturing a metal pipe comprised of the plurality of metal pieces using a direct extrusion process.

BACKGROUND ART

An extrusion molding is a molding method of pressing a work, such as a metal billet within a container and discharging an extrudate having a predetermined shape through an extrusion hole. Such an extrusion molding includes a direct extrusion method and an indirect method. The direct extrusion method is a method of manufacturing an extrudate by pushing one end of a work and discharging the extrudate through an extrusion hole disposed at a side opposite to the one end. On the contrary, the indirect extrusion method is a method of manufacturing an extrudate by discharging the extrudate in a direction opposite to a direction in which a work is pushed.

A metal pipe may be manufactured using the extrusion molding. When the direct extrusion method is used to manufacture a hollow pipe, a work passes through an extrusion hole comprised of a plurality of ports to obtain a plurality of metal pieces and then the plurality of metal pieces are again bonded in a solid state, thereby manufacturing a metal pipe. In this case, when the metal pieces that have separately passed through an extrusion hole in a solid state along a length direction of the metal pipe by the ports are again bonded to each other, a bonding trace is generated, which is called a seam line. For example, in the case of a molding having three extrusion holes each comprised of three ports, three seam lines are formed in an extrusion direction by a direct extrusion process. Since these seam lines are formed in an extrusion process by a mechanical bonding, although the bonding appears to be normal as viewed with naked eyes, such seam lines are actually mechanically weak portions, so when pressure of a fluid is generated in a metal pipe, the seam lines are easily damaged. In FIG. 11, a portion (marked with a circle) in which the seam line is burst is shown in a pipe expansion process in which hot-air forming of a metal pipe manufactured by the direct extrusion method is performed. It may be confirmed from FIG. 11 that when a high gas pressure is applied to an inside of the metal pipe, a weak seam line region does not withstand the high pressure and thus burst.

Since the indirect extrusion method does not go through a port during molding, a seamless pipe may be manufactured without a seam line that is a bonding of a solid state inevitably generated in an existing direct extrusion process. However, since the indirect extrusion method is performed by a batch method, it has disadvantages in that the process may not be continuously performed and a large force may not be applied compared to the direct extrusion method.

Various mechanical devices used in such an extrusion molding are installed in a narrow space, and thus are spatially limited. The mechanical devices include a driving source supplying power, and the driving source typically includes a motor operated by a magnetic force, a cylinder operated by a working fluid or the like. The more the driving source, the more difficult the installation due to a limitation of the space, so that the installation costs of devices increase, and an energy waste is generated in each of the driving sources, thus lowering work efficiency.

DETAILED DESCRIPTION OF THE INVENTION

Technical Problem

The present disclosure provides an apparatus and a method of manufacturing a seamless pipe by performing a friction stir bonding of a seam line at a point after which a work passes through ports of a molding, the seam line being inevitably formed since the work passes through an extrusion hole comprised of ports of the molding in an extrusion process by a direct extrusion method.

Technical Solution

In accordance with an exemplary embodiment, an apparatus of manufacturing a seamless pipe includes: a container receiving a work therein; a stem pressing one end of the work within the container; a die installed in a direction opposite to the stem, and having an extrusion hole comprised of a plurality of ports; a rotation member installed on a front end of the die, having a stirring tip inserted into a joint surface formed by abutting a plurality of metal pieces to each other on one surface thereof, and rotating to perform a friction stir bonding while rotating in a state in which the one surface contacts the joint surface; and a correction mold including a metal pipe discharging path receiving a metal pipe manufactured by the friction stir bonding and discharging the metal pipe to an outside.

The metal pipe discharging path may be a space formed between an cylindrical empty space formed in an inside of the correction mold along an extrusion direction and a rod connected to a center portion of one surface of the die, having a smaller inner diameter than the empty space and extending to an inside of the empty space.

The rotation member may be provided in plurality.

In accordance with another exemplary embodiment, a method of manufacturing a seamless pipe includes: discharging a plurality of metal pieces through an extrusion hole receiving a work therein and having a plurality of ports provided inside a die; performing a joint surface by abutting the plurality of metal pieces to each other; manufacturing a metal pipe by directly contacting a rotation member to the joint surface and rotating the rotation member to perform a friction stir bonding of the plurality of metal pieces; and discharging the metal pipe to an outside through a metal pipe discharging path formed in a correction mold.

The metal piece discharged through the extrusion hole may have a predetermined curved surface shape.

The work may include any one selected from the group consisting of aluminum, copper, magnesium, a steel material and alloys of these metals.

In accordance with yet another exemplary embodiment, an apparatus of manufacturing a seamless pipe includes: a container receiving a work therein; a stem pressing one end of the extruded material within the container; a die installed in a direction opposite to the stem, and having an extrusion hole comprised of a plurality of ports; a plurality of rotation members installed on a front end of the die, having a stirring tip inserted into a joint surface formed by abutting a plurality of metal pieces to each other on one surface thereof, and rotating to perform a friction stir bonding in a state in which the one surface contacts the joint surface; a driving unit distributing and transmitting a rotation driving force to the plurality of rotation members; and a correction mold including a metal pipe discharging path receiving a metal pipe manufactured by the friction stir bonding and discharging the metal pipe to an outside.

The driving unit may be include a single driving source and a distribution-type power transmission unit distributing and transmitting a rotation driving force of the single driving source to the plurality of rotation members.

The single driving source may be a motor.

The distribution-type power transmission unit may include a ring gear configured to surround the container and installed to freely rotate the ring gear having one side engaged with a rotation member side gear connected the rotation member, and the other end connected to the driving source.

The other side of the ring gear may be engaged with a driving source side gear connected to the single driving source.

A driven pulley may be installed on the other side of the ring gear and be connected to a driving pulley through a belt wherein the diving pulley is connected to the driving source.

A driven sprocket wheel may be installed on the other side of the ring gear and be connected to a driving sprocket wheel through a chain wherein the driven sprocket wheel is connected to the driving source.

A pair of bevel gears may be installed between the driving source side gear and the driving source of the distribution-type power transmission unit.

The plurality of rotation members may be disposed at equal angles on one side brim of the ring gear toward the work.

The distribution-type power transmission unit may include a distribution rotation shaft, in which a plurality of driving pulleys are installed on one side thereof and connected to a plurality of rotation member side pulleys to each other through a plurality of belts, in which the plurality of rotation member side pulleys are connected to the plurality of rotation members, respectively and the other side thereof is connected to the driving source.

The distribution-type power transmission unit may include a distribution rotation shaft, in which a plurality of driving sprocket wheels are installed on one side thereof and connected to a plurality of rotation member side sprocket wheels to each other through a plurality of chains, in which the plurality of rotation member side sprocket wheels are connected to the plurality of rotation members, respectively and the other side thereof is connected to the driving source.

Advantageous Effects

As described above, in accordance with embodiments of the present invention, since a seamless pipe is manufactured by a friction stir bonding of a seam line generated when passing through an extrusion hole comprised of a plurality of holes within a die where an extrusion proceeds is manufactured, the seamless pipe having excellent mechanical strength in a bonding portion thereof without any seam line may be continuously manufactured. Further, an installation space may be saved by reducing a size of an apparatus, and energy waste may be prevented and manufacturing cost of the apparatus may be reduced by minimize the number of driving sources. Of course, the scope of the present invention is not be limited by these effects.

BRIEF DESCRIPTION OF THE DRAWINGS

FIG. 1 is a schematic diagram illustrating a process of manufacturing a seamless pipe using an apparatus of manufacturing a seamless pipe in accordance with an embodiment of the present invention;

FIG. 2 is a front view illustrating a shape of a die used in an apparatus of manufacturing a seamless pipe in accordance with an embodiment of the present invention;

FIG. 3 is a schematic perspective view illustrating a process of manufacturing a seamless pipe using an apparatus of manufacturing a seamless pipe in accordance with an embodiment of the present invention;

FIG. 4 is a view conceptually showing a principle of friction stir bonding;

FIGS. 7A and 7B are results obtained by observing a bonding portion of an aluminum tube manufactured according to an embodiment of the present invention and a bonding portion of an aluminum tube manufactured according to an existing method, respectively;

FIG. 8 is a schematic cross-sectional view illustrating an apparatus of manufacturing a seamless pipe in accordance with some embodiments of the present invention;

FIG. 9 is a schematic perspective view illustrating an apparatus of manufacturing a seamless pipe in accordance with some embodiments of the present invention;

FIG. 10 is a schematic perspective view illustrating an apparatus of manufacturing a seamless pipe in accordance with some embodiments of the present invention;

FIG. 11 is a schematic cross-sectional view illustrating an apparatus of manufacturing a seamless pipe in accordance with some embodiments of the present invention;

FIG. 12 is a schematic cross-sectional view illustrating an apparatus of manufacturing a seamless pipe in accordance with some embodiments of the present invention;

FIG. 13 is a schematic cross-sectional view illustrating an apparatus of manufacturing a seamless pipe in accordance with some embodiments of the present invention;

FIG. 14 is a schematic cross-sectional view illustrating an apparatus of manufacturing a seamless pipe in accordance with some embodiments of the present invention; and FIG. 15 is a schematic cross-sectional view illustrating an apparatus of manufacturing a seamless pipe in accordance with some embodiments of the present invention.

BEST MODE

Figure 5:
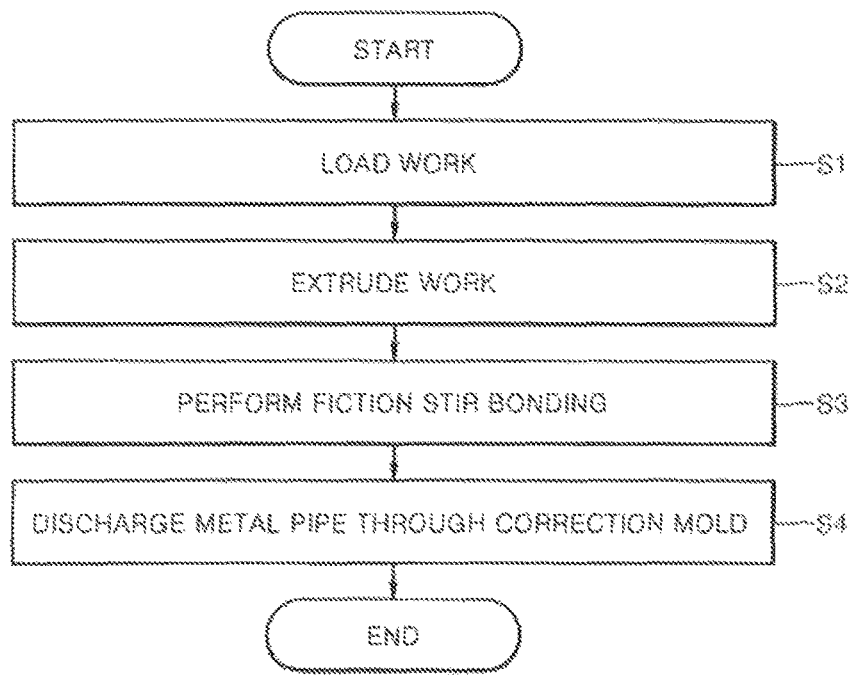
FIG. 5 is a step-by-step flow diagram showing a method of manufacturing a seamless pipe.
Figure 6:
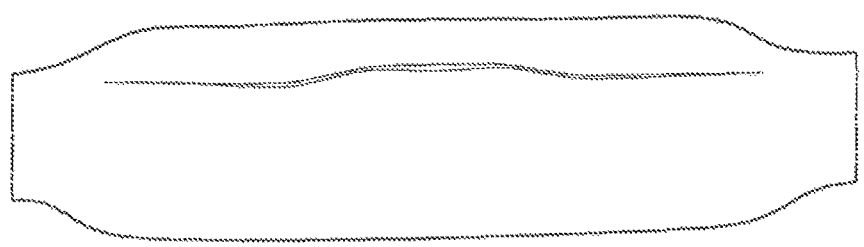
FIG. 6 is a photograph showing a portion in which a seam line bursts in a hot gas forming process of a metal pipe manufacture by an existing method.

Hereinafter embodiments of the present invention will be described as follows with reference to accompanying drawings. The invention may, however, be not limited to the embodiments set forth herein and be embodied in many different forms; rather, these embodiments are provided so that this disclosure will be thorough and complete, and will fully convey the concept of the invention to those skilled in the art. Also, in the drawings, the size of each constituent element may be scaled up or down for convenience of description.

In the following embodiments, X-axis, Y-axis and Z-axis are not limited to the three axes on the Cartesian coordinate system, rather may be construed broadly including theses. For example, X-axis, Y-axis and Z-axis are orthogonal to each other, however, X-axis, Y-axis and Z-axis are not may refer to other directions being not orthogonal to each other.

A schematic cross-sectional view of an apparatus 100 of manufacturing a seamless pipe in accordance with an embodiment of the present invention is shown in FIG. 1.

In referring to FIG. 1, a container 110 for loading a work 130 may be provided. For example, the work 130 may be loaded to an inside of the container 100 in the form of a metal billet. The container 100 may have an internal structure and an appearance in various shapes so as to receive the work therein. Therefore, shapes of the work 130 and the container 100 may be variously modified, and does not restrict the scope of this embodiment.

A stem 112 may be disposed within the container 100 so as to push and press the work 130 in the container 100. For example, in order for an effective compression of the work 130, an appearance of the stem 112 may be adapted to an inner shape of the container 100. As another example, the appearance of the stem 112 may not match a shape of an inner hole 115, and in this case, a portion of the work 130 may not be compressed and remain in the container 100. The stem 112 may be called a ram or a compressor, and the scope of this embodiment is not limited by the term and the shape.

A die 114 may be coupled to a front end of the container 100 in an opposite side to the stem 112. For example, the stem 112, the container 110, and the die 114 may be arranged and coupled to each other in a line, for example, in an X-axis direction. Such an X-axis direction may become an extrusion direction of the work 130. In a modification example of this embodiment, the stem 112, the container 100, and the die 114 may not be arranged in a line, and in this case, the extrusion direction may be mainly determined on the basis of the die 114.

The die 114 may have an extrusion hole 116 defining an extrusion shape of the work 130. At this time, the extrusion hole 116 may be comprised of a plurality of ports separated from each other. A shape of the extrusion hole 116 comprised of the plurality of ports is illustrated in FIGS. 2A and 2B. For example, the extrusion hole 116 of FIG. 2 is comprised of two ports 116a and 116b, and the extrusion hole 116 of FIG. 2b is comprised of three ports 116a and 116b, and 116c.

The extrusion hole 116 may have a shape having a curved surface forming a portion of a pipe as shown in FIG. 2.

The work 130 is discharged in the form of a plurality of metal pieces 132 through the extrusion hole 116 comprised of the plurality of ports. For example, two metal pieces are discharged in FIG. 2A, and three metal pieces are discharged in FIG. 2B.

A friction stir bonding unit for bonding the metal pieces 132 discharged through the extrusion hole 116 may be provided to a front end of the die 114. In more detail, the friction stir bonding unit includes rotation members 118a and 118b directly contactable to a region where the plurality of metal pieces contact each other and a driving unit 120 capable of transmitting a rotation driving force to the rotation members 118a and 118b. At this time, stirring tips 119a and 119b are formed on a surface that is one surface of the rotation members 118a and 118b and contact the metal piece 132.

The friction stir bonding is a method in which although bonding base materials are not melted, the bonding base materials are able to be bonded to each other, and a principle of the friction stir bonding is shown in FIG. 4. Referring to the FIG. 4, a rotation member 410 having a hard material compared to the bonding materials 400a and 400b is provided along a joint surface 410 formed by abutting the separated bonding base materials 400a and 400b to each other. At this time, a stirring tip 422 is formed at an end of the rotation member 420. The stirring tip 422 may have a circular bar shape, and is inserted into the joint surface 410. After the stirring tip 422 is inserted into the joint surface 420, the rotation member 420 moves along the joint surface 410 while rotating in a high speed. At this time, when a friction heat is generated while the stirring tip 422 connected to the rotation member 420 is rotating, the periphery of the joint surface 410 is softened and the bonding materials are forcedly mixed in the state that melting of the bonding base materials does not occur due to a plastic flow of the bonding base materials by stirring of the stirring tip 422. A bonding portion 430 between the bonding base materials 400a and 400b is formed by such a mixing, and a bonding is formed along the joint surface 410.

Such a friction stir bonding is a solid phase bonding in which the bonding is formed in the state that melting does not occur, and the bonding portion is not almost deformed according to the bonding. Also, since defects, such as pores, cracks, or the like that are prone to occur in a fusion bonding do not almost occur, a mechanical strength of the bonding portion is excellent.

A process of bonding the metal pieces by such a friction stir bonding is shown in FIG. 3. Referring to FIGS. 1 and 3, two metal pieces 132a and 132b discharged through the extrusion hole 116 proceeds parallel to each other in an extrusion direction (+X direction) and are abutted to each other, thus a joint surface 133 is formed. Rotation members 118a and 118b capable of moving in a vertical direction are disposed on an upper portion and a lower portion of the joint surface 133, and each of these rotation members 118a and 118b moves in the vertical direction to contact the joint surface 133. The contacted rotation members 132a and 132b receive a driving force from the driving unit 120 and rotate, and thus allow the two metal pieces 132a and 132b to be friction stir bonded.

At this time, since the stem 112 in the inside of the container 110 continuously presses the work 130 and discharges the metal pieces 132a and 132b through the extrusion hole 116, the metal pieces 118a and 118b continuously move in the relative extrusion direction (+X-axis direction) with respect to the rotation members 118a and 118b.

The joint surface 133 is continuously bonded along the extrusion direction (+X-axis direction) by such a movement, and such a bonded metal pipe continuously enters a correction mold 123. The correction mold 123 is a mold allowing the metal pipe bonded by the rotation members 118a and 118b to be securely exhausted to the outside.

At this time, the correction mold 123 has a metal pipe extrusion path comprised of a space formed between an empty space 121 of a cylinder shape formed inside along the extrusion direction (+X-axis direction) and a rod connected to a center portion of one surface of the die 114, having an internal diameter smaller than the empty space 121 along the extrusion direction (+X-axis direction) and extending to an inner side of the empty space 121. Therefore, the metal pieces 132a and 132b discharged through the extrusion hole 116 by extruding are friction stir bonded and then are discharged to the outside through the metal pipe discharging path of the correction mold 123.

Immediately after the friction stir bonding, although a bonding trace or a burr may be generated on a circumferential surface in the friction stir bonding process, when the metal pieces 132a and 132b are discharged through the metal pipe discharging path formed within the correction mold 123, occurrences of the bonding trace and the burr may be prevented. Also, a diameter of the metal pipe may be reduced by 5% by correction while passing through the correction mold 123.

FIG. 5 is a step-by-step flow diagram showing a method of manufacturing a seamless pipe.

Referring to FIG. 5, firstly, a work 130 is loaded into an inside of the container 110 (S1). At this time, the work 130 may be loaded into the inside of the container 110 in the form of a billet. The work 130 may be of aluminum, copper, magnesium, an alloy thereof, or a steel material.

At this time, the work 130 may be heated to a predetermined temperature, softened, and then loaded into the container 100. Alternatively, the work 130 may be heated and softened within the container 110 using a heating unit (not shown) for heating the work 130 prior to extrusion molding.

Next, the meal pieces 132*a* and 132*b* are discharged in plurality through the extrusion hole 116 having a plurality of ports provided to the die 114 while pressing one end of the work 130 using the stem 112 (S2). At this time, a shape of the metal pieces 132*a* and 132*b* is defined by the extrusion hole 116, and may be a shape having a predetermined curved surface according to the shape of the extrusion hole 116.

Next, a joint surface 133 is formed by abutting the metal pieces 132*a* and 132*b* to each other, rotation members 118*a* and 118*b* directly contact the joint surface 133 and rotate, and then the metal spices 132*a* and 132*b* are friction stir bonded (S3).

Next, the metal pipe manufactured by the friction stir bonding is discharged to the outside through the metal pipe discharging path of the correction molds 123 (S4).

At this time, since the metal pieces 132*a*, 132*b* are continuously discharged in an extrusion direction (+X direction) through the extrusion hole 116, the metal pieces 132*a* and 132*b* respectively move in the extrusion direction (+X direction) with respect to rotation members 118*a* and 118*b*. Due to this, an effect in which the friction stir bonding is continuously performed along the extrusion direction (+X direction) by the rotation members 118*a* and 118*b* appears on the joint surface 133. Therefore, a pipe may be continuously manufactured until the extrusion molding is substantially completed.

In accordance with an embodiment of the present invention, since the metal pipe is manufactured by bonding the extruded metal pieces by the friction stir bonding, the seamless pipe having excellent mechanical strength in a bonding portion thereof without any seam line may be continuously manufactured.

FIG. 7A is a result obtained by observing a bonding portion of a tube of a 5000 series aluminum alloy manufactured by a friction stir bonding according to embodiments of the present invention, and FIG. 7B is a result obtained by observing a seam line of a tube of a 5000 series aluminum alloy manufactured by an commonly existing direct extrusion method as a comparative example. Referring to FIGS. 7A and 7B, it is seen that the seam line (an arrow of FIG. 7B) is observed in case of the existing method, and not observed in the case according to embodiments of the present invention.

An apparatus 100 of manufacturing a seamless pipe according another embodiment of the present invention is shown in FIGS. 8 and 9. The apparatus 100 of manufacturing a seamless pipe is an apparatus in which some elements in the apparatus of manufacturing the seamless pipe shown FIGS. 1 to 4 are modified or a new element is added, thus, repeated description in these embodiments will be omitted.

Referring to FIG. 8, a container 100 for loading a work 130 may be provided. The container 100 may have an internal structure and an appearance in various shapes so as to receive the work therein. A stem 112 may be disposed within the container so as to push and press the work 130 in an inside of the container 110. A die 114 may be coupled to a front end of the container 110 at an opposite side of the stem 112.

The die 114 may have an extrusion hole 116 defining a shape of the work 130. At this time, the extrusion hole may be comprised of a plurality of ports separated from each other. The extrusion hole 116 comprised of the plurality of ports may have various shapes.

The work 130 is discharged through the extrusion hole 116 comprised of the plurality of ports in a plurality of metal pieces 132. A friction stir bonding unit may be provided to a front end of the die 114 so as to bond the metal pieces 132. Especially, the friction stir bonding unit includes rotation members 118*a* and 118*b* directly contactable to a region where the plurality of metal pieces are contacted to each other, and a driving unit 120 capable of transmitting a rotation driving force to the rotation members 118*a* and 118*b*. At this time, stirring tips 119*a* and 119*b* are formed on a surface that is one surface of the rotation members 118*a* and 118*b* and contacts the metal pieces 132.

Referring to FIGS. 8 and 9, some embodiments of the present invention may be provided with a driving unit 120 distributing and transmitting a rotation driving force to the plurality of rotation members 118*a* and 118*b*. The driving unit 120 may include a single driving source 120-2 and a distribution-type power transmission unit 120-1 distributing and transmitting a rotation driving force of the single driving source 120-2 to the plurality of rotation members 118*a* and 118*b*. Here, although it is shown that the single driving source 120-2 is a motor, various operating sources, such as a cylinder operated by a working fluid, a linear motor or the like as well as the motor may be applied.

The distribution-type power transmitting unit 120-1 may include a ring gear 120-14 installed in a ring shape surrounding the container 100 so as to freely rotate by a bearing B, in which one side thereof is engaged with a rotation member side gear 120-15 connected to the rotation members 118*a* and 118*b*, and the other side thereof is connected to the driving source 120-2. The other side of the ring gear 120-14 may be engaged with the driving source side gear 120-13 connected to the driving source 120-2, and the distribution-type power transmitting unit 120-1 may be provided with a pair of bevel gears 120-11 and 120-12 engaged with each other installed between the driving source side gear 120-13 and the driving source 120-2.

In describing an operation relation of the distribution-type power transmission apparatus, as shown in FIG. 9, when the single driving source 120-2 rotates the bevel gear 120-11, the bevel gear 120-12 engaged with the bevel gear 120-11 rotates, and then the driving source side gear 120-13 rotates. Subsequently, the driving source side gear 120-13 rotates the ring gear 120-4, and then the ring gear 120-4 concurrently rotates the two rotation member side gears 120-15 engaged therewith. Therefore, the metal pieces may be friction stir bonded while the rotation members 118*a* and 118*b* rotate together with a rotation of the rotation member side gear 120-15.

Referring to FIG. 9, the rotation members may be installed in various number, in which two rotation members 118*a* and 118*b* may be disposed at an equal angle of 180 degrees toward the work 130 on one side brim of the ring gear 120-14, referring to FIG. 10, three rotation members 118*a*, 118*b*, and 118*c* may be disposed at an equal angle of 120 degrees toward the work 130 on the one side brim of the ring gear 120-4, or, referring to FIG. 11, four rotation members 118*a*, 118*b*, 118*c*, and 118*d* may be disposed at an equal angle of 90 degrees toward the work 130 on the one side brim of the ring gear 120-4.

FIG. 12 is a schematic perspective view illustrating an apparatus 200 of manufacturing a seamless pipe according to some embodiments of the present invention. Referring to FIG. 12, a driven pulley 120-19 may be installed on the other side of the ring gear 120-14 and be connected to a driving pulley 120-18 through a belt 120-17, in which the driving pulley 120-18 is connected to the driving source 120-2.

In describing an operation relation of the distribution-type power transmission apparatus, as shown in FIG. 12, when the single driving source 120-2 rotates the driving pulley 120-18, the driven pulley is rotated by the belt 120-17, so that the ring gear 120-14 rotates. Subsequently, the ring gear 120-4 concurrently rotates the two rotation member side gears 120-15 engaged therewith. Therefore, the metal pieces may be friction stir bonded to each other while the rotation members 118*a* and 118*b* rotate together with a rotation of the rotation member side gear 120-15.

FIG. 13 is a schematic perspective view illustrating an apparatus 200 of manufacturing a seamless pipe according to some embodiments of the present invention. Referring to FIG. 13, a sprocket wheel 120-22 may be installed on the other side of the ring gear 120-14 and be connected to a driving sprocket wheel 120-21 through a chain 120-20, in which the driving sprocket wheel 120-21 is connected to the driving source 120-2.

In describing an operation relation of the distribution-type power transmission apparatus, as shown in FIG. 13, when the single driving source 120-2 rotates the driving sprocket wheel 120-21, the driven sprocket wheel 120-22 is rotated by the chain 120-12, so that the ring gear 120-14 rotates. Therefore, the metal pieces may be friction stir bonded to each other while the rotation members 118*a* and 118*b* rotate together with a rotation of the rotation member side gear 120-15.

FIG. 14 is a schematic perspective view illustrating an apparatus 400 of manufacturing a seamless pipe according to some embodiments of the present invention. Referring to FIG. 14, the distribution-type power transmitting unit 120-5 may include a distribution rotation shaft 120-5 in which a plurality of driving pulley 120-24 are installed on one side thereof and are connected to a plurality of rotation member side pulleys 120-26 to each other through a plurality of belts 120-23 in which the plurality of rotation member side pulleys are connected to the plurality of rotation members 118*a* and 118*b*, and the other side thereof is connected to the driving source 120-2.

In describing an operation relation of the distribution-type power transmission apparatus 120-5, as shown in FIG. 14, when the single driving source 120-2 rotates the distribution rotation shaft 120-25, the two driving pulley concurrently rotates together with the distribution rotation shaft 120-5, and then the rotation member side pulleys 120-26 is rotated by the two belts 120-23. Therefore, the metal pieces may be friction stir bonded to each other while the rotation members 118*a* and 118*b* rotate together with rotations of the rotation member side pulleys 120-6.

FIG. 15 is a schematic perspective view illustrating an apparatus 500 of manufacturing a seamless pipe according to some embodiments of the present invention. Referring to FIG. 15, the distribution-type power transmitting unit 120-5 may include a distribution rotation shaft 120-30 in which a plurality of driving sprocket wheels 120-28 are installed on one side thereof and are connected to a plurality of rotation member side sprocket wheels 120-27 through a plurality of chains 120-28 in which the plurality of rotation member side sprocket wheels are connected to the plurality of rotation members 118*a* and 118*b*, and the other side thereof is connected to the driving source 120-2.

In describing an operation relation of the distribution-type power transmission apparatus 120-6, as shown in FIG. 15, when the single driving source 120-2 rotates the distribution rotation shaft 120-30, the two driving sprocket wheels 120-28 concurrently rotates together with the distribution rotation shaft 120-30, and then the rotation member side sprocket wheels 120-17 is rotated by the two chains 120-29. Therefore, the metal pieces may be friction stir bonded to each other while the rotation members 118*a* and 118*b* rotate together with rotations of the rotation member side sprocket wheels 120-27.

Meanwhile, as a modification example of the above described embodiments, the ring gear 120-14 may be directly connected to the single driving source 120-2 without middle connection means, such as a pulley, a chain, or a bevel gear.

Although the apparatus and the method of manufacturing the seamless pipe have been described with reference to the specific embodiments, they are not limited thereto. Therefore, it will be readily understood by those skilled in the art that various modifications and changes can be made thereto without departing from the spirit and scope of the present invention defined by the appended claims.

The invention claimed is:

1. An apparatus of manufacturing a seamless pipe, the apparatus comprising:
   a container configured to receive a work;
   a stem at least partially disposed within the container and configured to press one end of the work;
   a die coupled to the container and provided in a direction opposite to the stem, the die having an extrusion hole that comprises a plurality of ports through which the work passes when the stem presses the work so as to form abutting metal pieces that abut at a joint surface of the metal pieces;
   a rotation member provided on a front end of the die, the rotation member having a stirring tip that is inserted into the extrusion hole such that the stirring tip is inserted into the joint surface of the metal pieces when the work is pressed by the stem, and the stirring tip being configured to rotate to perform a friction stir bonding in a state in which the rotation member contacts the joint surface; and
   a correction mold including a metal pipe discharging path for receiving a metal pipe manufactured by the friction stir bonding and discharging the metal pipe to the outside.

2. The apparatus of claim 1,
   wherein the metal pipe discharging path is formed by:
   a cylindrical opening formed in the correction mold and extending along an extrusion direction from the extrusion hole to an outside; and
   a rod connected to a center portion of one surface of the die and extending from the one surface of the die to the outside, the rod having a smaller inner diameter than a diameter of the cylindrical opening such that a space is formed between an outer surface of the rod and an inner surface of the cylindrical opening.

3. The apparatus of claim 1,
   wherein a plurality of the rotation members are provided on the front end of the die.

4. A method of manufacturing a seamless pipe, the method comprising:
- receiving, by an extrusion hole, a work, wherein the extrusion hole has is formed within a die and has a plurality of ports;
- passing the work through the extrusion hole such that abutting metal pieces are formed, the metal pieces abutting at a joint surface of the metal pieces;
- placing the joint surface of the metal pieces in direct contact with a rotation member and rotating the rotation member to perform a friction stir bonding of the abutting metal pieces; and
- discharging the metal pipe to the outside through a metal pipe discharging path formed in a correction mold.

5. The method of claim 4,
wherein the metal pieces formed by passing the work through the extrusion hole have a curved surface.

6. The method of claim 4,
wherein the work includes one material selected from the group consisting of aluminum, copper, magnesium, a steel material, and alloys thereof.

7. An apparatus of manufacturing a seamless pipe, the apparatus comprising:
- a container configured to receive a work;
- a stem at least partially disposed within the container and configured to press one end of the work;
- a die coupled to the container and provided in a direction opposite to the stem, the die having an extrusion hole that comprises a plurality of ports through which the work passes when the stem presses the work so as to form abutting metal pieces that abut at a joint surface of the metal pieces;
- a plurality of rotation members provided on a front end of the die, each of the plurality of rotation members having a stirring tip inserted into the extrusion hole such that the stirring tip is inserted into the joint surface of the metal pieces when the work is pressed by the stem, and the stirring tip being configured to rotate to perform a friction stir bonding in a state in which the rotation member contacts the joint surface;
- a driving unit distributing and transmitting a rotational driving force to the plurality of rotation members; and
- a correction mold including a metal pipe discharging path for receiving a metal pipe manufactured by the friction stir bonding and discharging the metal pipe to an outside.

8. The apparatus of claim 7,
wherein the driving unit comprises:
a single driving source; and
a distribution-type power transmission unit distributing and transmitting a rotational driving force of the single driving source to the plurality of rotation members.

9. The apparatus of claim 8,
wherein the single driving source is a motor.

10. The apparatus of claim 8,
wherein the distribution-type power transmission unit comprises a ring gear configured to surround the container and installed to freely rotate, the ring gear having one side engaged with a rotation member side gear connected the rotation member, and the other end connected to the driving source.

11. The apparatus of claim 10,
wherein the other side of the ring gear is engaged with a driving source side gear connected to the single driving source.

12. The apparatus of claim 10,
wherein a driven pulley is provided on the other side of the ring gear and is connected to a driving pulley through a belt, wherein the driving pulley is connected to the driving source.

13. The apparatus of claim 10,
wherein a driven sprocket wheel is provided on the other side of the ring gear and is connected to a driving sprocket wheel through a chain, wherein the driven sprocket wheel is connected to the driving source.

14. The apparatus of claim 11,
wherein a pair of bevel gears is installed between the driving source side gear and the driving source of the distribution-type power transmission unit.

15. The apparatus of claim 10,
wherein the plurality of rotation members is disposed at equal angles on one side brim of the ring gear toward the work.

16. The apparatus of claim 8,
wherein the distribution-type power transmission unit comprises a distribution rotation shaft, in which a plurality of driving pulleys is provided on one side thereof and connected to a plurality of rotation member side pulleys to each other through a plurality of belts, in which the plurality of rotation member side pulleys is connected to the plurality of rotation members, respectively and the other side thereof is connected to the driving source.

17. The apparatus of claim 8,
wherein the distribution-type power transmission unit comprises a distribution rotation shaft, in which a plurality of driving sprocket wheels is provided on one side thereof and connected to a plurality of rotation member side sprocket wheels to each other through a plurality of chains, in which the plurality of rotation member side sprocket wheels is connected to the plurality of rotation members, respectively and the other side thereof is connected to the driving source.

* * * * *